(12) United States Patent
Moritz (10) Patent No.: US 9,630,385 B2
(45) Date of Patent: *Apr. 25, 2017

(54) RELEASABLE POLYESTER METAL TRANSFER FILM

(71) Applicant: Jan Moritz, Bristol, RI (US)

(72) Inventor: Jan Moritz, Bristol, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/930,395

(22) Filed: Jun. 28, 2013

(65) Prior Publication Data

US 2014/0124128 A1  May 8, 2014

Related U.S. Application Data

(60) Provisional application No. 61/723,967, filed on Nov. 8, 2012.

(51) Int. Cl.
*B44C 1/17* (2006.01)
*B32B 37/00* (2006.01)
(Continued)

(52) U.S. Cl.
CPC ............. *B32B 37/025* (2013.01); *B44C 1/14* (2013.01); *B44C 1/16* (2013.01); *C08J 7/042* (2013.01);
(Continued)

(58) Field of Classification Search
CPC ........... B32B 2309/105; B32B 2311/00; B32B 2367/00; B32B 37/025; B32B 37/12;
(Continued)

(56) References Cited

U.S. PATENT DOCUMENTS 3,480,500 A * 11/1969 Hotter .................. B41M 1/24
101/32
3,926,707 A * 12/1975 Glaser .................. B41M 1/30
156/239

(Continued)

FOREIGN PATENT DOCUMENTS

EP  0541103 A1  5/1993
EP  1752307 A1  2/2007
(Continued)

OTHER PUBLICATIONS

Written Opinion for PCT/US13/68655.*
(Continued)

*Primary Examiner* — Alex Efta
(74) *Attorney, Agent, or Firm* — Jeffrey C. Lew (57) ABSTRACT

A carrier film of thermoplastic polyester has releasable metal adhesive properties suitable for a metal transfer in which the polyester film is metalized and the metal layer is subsequently transferred to a permanent adhesive-coated substrate. The metal layer is in direct contact with the polyester carrier film and no intermediate release layer is present. Desired metal adhesion is provided by dispersing a suitable surfactant, and optionally, a hydrocarbon wax, uniformly into the polyester film. Surfactant on the outer surface of the carrier film modifies metal adhesion to the polyester such that the metal can be removed in a metal transfer operation.

18 Claims, 1 Drawing Sheet (51) Int. Cl.
*B44C 1/16* (2006.01)
*B44C 1/14* (2006.01)
*C08J 7/04* (2006.01)
*B32B 37/12* (2006.01)

(52) U.S. Cl.
CPC ......... *B32B 37/12* (2013.01); *B32B 2309/105* (2013.01); *B32B 2311/00* (2013.01); *B32B 2367/00* (2013.01); *Y10T 428/264* (2015.01)

(58) Field of Classification Search
CPC ......... Y10T 428/264; Y10T 428/24372; Y10T 156/22; Y10T 156/1168; B44C 1/14; B44C 1/16
USPC .................. 156/233, 241, 247, 249, 289
See application file for complete search history.

(56) References Cited

U.S. PATENT DOCUMENTS

| | | | |
|---|---|---|---|
| 3,984,598 A | | 10/1976 | Sarazin et al. |
| 4,012,552 A | * | 3/1977 | Watts ............... B41M 3/12 156/233 |
| 4,250,209 A | | 2/1981 | de Leeuw et al. |
| 4,473,422 A | * | 9/1984 | Parker ............... D21H 19/02 156/233 |
| 4,490,409 A | * | 12/1984 | Nablo ............... B05D 1/286 427/147 |
| 4,824,498 A | * | 4/1989 | Goodwin ........... A47G 27/0468 156/71 |
| 4,868,049 A | | 9/1989 | Nelson |
| 5,370,930 A | | 12/1994 | Ito |
| 5,397,827 A | | 3/1995 | Kimura et al. |
| 5,665,194 A | * | 9/1997 | Kay ............... B32B 38/10 156/285 |
| 6,040,268 A | * | 3/2000 | Ueno ............... B41M 7/0027 156/235 |
| 6,120,693 A | | 9/2000 | Petti et al. |
| 6,395,120 B1 | * | 5/2002 | Bradbury-Harris ... B41F 19/062 156/230 |
| 6,916,526 B1 | | 7/2005 | Chang et al. |
| 2001/0055676 A1 | | 12/2001 | Smith |
| 2002/0003635 A1 | * | 1/2002 | Boswell ............... B32B 38/06 359/1 |
| 2002/0031661 A1 | | 3/2002 | Bilodeau et al. |
| 2002/0051872 A1 | | 5/2002 | Bartsch et al. |
| 2002/0058194 A1 | | 5/2002 | Williams et al. |
| 2003/0124365 A1 | | 7/2003 | Posey et al. |
| 2003/0213548 A1 | | 11/2003 | Lehrter et al. |
| 2004/0013892 A1 | | 1/2004 | Yano et al. |
| 2004/0076819 A1 | | 4/2004 | Pitt et al. |
| 2005/0167035 A1 | * | 8/2005 | Laskey ............... B32B 37/0076 156/230 |
| 2005/0196595 A1 | * | 9/2005 | Morris ............... B32B 15/04 428/209 |
| 2007/0196677 A1 | | 8/2007 | Okumura |
| 2008/0009412 A1 | | 1/2008 | Funada et al. |
| 2008/0015108 A1 | | 1/2008 | Yamamoto et al. |
| 2008/0213551 A1 | * | 9/2008 | Funicelli ............... B44C 1/1737 428/209 |
| 2009/0286054 A1 | | 11/2009 | Meiki et al. |
| 2010/0044078 A1 | | 2/2010 | Narahashi et al. |
| 2011/0107933 A1 | * | 5/2011 | Yamamoto ........... B32B 27/36 101/492 |
| 2011/0317269 A1 | | 12/2011 | Paolilli et al. |

FOREIGN PATENT DOCUMENTS

| | | | | |
|---|---|---|---|---|
| JP | 56-017261 A | | 2/1981 | |
| JP | 01093391 A | * | 4/1989 | ............... B44C 1/14 |
| JP | 07195855 | | 8/1995 | |
| JP | 2009220283 A | | 10/2009 | |
| WO | 2009034857 A1 | | 3/2009 | |
| WO | 2012/002992 A1 | | 1/2012 | |

OTHER PUBLICATIONS

International Search Report for PCT/US13/68655.*
Compendium of Chemical Terminology Gold Book Ver. 2.3.3 (Feb. 24, 2014) International Union of Pure and Applied chemistry, 1622pp. p. 1030.
Metallizing Technical Reference, Association of International Metallizers, Coaters and Laminators, fifth edition. May, 2012, Table of Contents, Chapters 1-3, 54pp.
https://en.wikipedia.org/wiki/Absorbance, printed Jan. 17, 2017.

* cited by examiner

RELEASABLE POLYESTER METAL TRANSFER FILM

FIELD OF THE INVENTION

This invention relates to polyethylene terephthalate (PET) films with release properties suitable for transferring metal to substrates, such as paperboard. More specifically it relates to a metalized PET film able to receive, carry, and transfer onto a substrate a metal layer directly in contact with the PET layer of the film.

BACKGROUND OF THE INVENTION

Polymeric films such as PET film are commonly used to transfer metal to paperboard and other substrates for use in packaging, greeting cards, and similar product applications where it is desirable to give the product a metallic appearance. The technique of transferring metal from film to another substrate is used where it is not practical to metalize such substrates directly.

One typical metal transfer technique uses a metalized conventional polymeric film and bonds the complete metalized film structure to the substrate. Typical methods for depositing metal onto the polymeric film include vapor and sputter metallization processes. Such deposition techniques typically create strong bonds between the metal and the film. Because metal does not readily separate from the polymeric layer of the film, in the transfer procedure the paperboard substrate becomes permanently bonded to the metalized polymeric film. This can create excessive non-recoverable scrap since the resulting laminate, for example generated by post-consumer packaging disposal, can not be easily recycled.

Another technique that is well known and practiced in industry is to create a carrier film that can be used to transfer a metal layer to paperboard and other substrate materials. The carrier film is created by coating a layer of release material on the base polymeric film in a secondary, separate process from producing the base polymeric film. Subsequently, and in an entirely separate third process, a metal layer is deposited onto the release layer for example by vapor or sputter metallization. The individual steps may be carried out at different locations by different converters. A disadvantage is that an extra processing step is required, in particular the step of applying a release layer. A need exists for biaxially oriented polyester films that can transfer metal from a layer deposited onto the carrier film surface to another substrate without the need for costly coatings between the metal layer and the carrier film surface.

The primary function of the release layer is to provide appropriate adhesion between the polymeric film surface and the metal layer. The adhesion of the metal to the film surface should be strong enough to endure handling in manufacture, packaging, shipping, etc. prior to metal transfer. However, adhesion should be sufficiently weak that the metal layer cleanly separates from the carrier film surface when contacted with the substrate.

There is a need for a method of metal transfer from a polymeric film to a substrate in which a metal layer can be applied directly onto the polymeric film and in which the metal layer readily releases and separates from the film. It is desirable to have a carrier film that does not have an added release layer on the surface of the polymeric film. It is further desired to have a carrier film for metal transfer in which the base layer is a single polymeric composition that can be recycled after the metal has been transferred. Still further it is desired to have a polyester-based carrier film and transfer film that is free of a non-polyester release layer.

SUMMARY OF THE INVENTION

The present invention provides a single or multi-layered thermoplastic polyester carrier film for metal transfer that is free of a non-polyester release layer. The composition of the thermoplastic polyester carrier film is preferably polyethylene terephthalate ("PET"). At least one surface of the novel carrier film is intended for receiving, carrying and releasing a metal layer in the process of transferring the metal layer to a substrate, such as paperboard. The metal receiving surface of the polyester carrier film has suitable metal adhesion and release properties that result from the incorporation of one or more release agents into the polyester carrier film metal-bearing layer.

In one aspect, the release agent is a surfactant. The surfactant can be an anionic surfactant, a nonionic surfactant or a combination of anionic and nonionic surfactants. The surfactant is dispersed within the carrier film metal-bearing layer. In another aspect the release agent in the novel polyester-based carrier film is a hydrocarbon composition wax.

Accordingly, the present invention provides a polyester carrier film for use in metal transfer, the film having a total thickness of about 4-75 μm, and consisting essentially of polyester and a release agent of composition and amount effective to provide at least one outer surface of the film with metal adhesion of less than 100 g/in. The total thickness of the polyester film of this invention is preferably about 5-75 μm, more preferably about 8-50 μm, and most preferably about 10-25 μm.

The invention also provides a method of transferring metal to a substrate comprising the steps of: (A) providing a polyester carrier film having a total thickness of 4-75 μm consisting essentially of polyester and a release agent, and (B) depositing a metal layer of thickness equivalent to an optical density in the range of up to about 4 in direct contact with an outer surface of the polyester carrier film, in which the release agent is of composition and amount effective to provide metal adhesion between the outer surface and the metal layer of about 1-100 g/in. Preferably the optical density of the metal layer is about 0.01-4, and more preferably about 0.4-3.3. Surface resistivity of the exposed side of the base layer is not critical, however, it typically is less than $1 \times 10^{17}$ ohm/square. The carrier film can be a composite of multiple polyester sub-layers.

DETAILED DESCRIPTION OF THE INVENTION

In certain aspects this invention relates to biaxially oriented coextruded multilayer polyester films that can be readily fabricated, have ease of handling, and metal release properties on at least one outer layer surface, for use in metal transfer processes. To fabricate this highly specialized film with special surface properties any standard method to fabricate co-extruded biaxially oriented multilayer films may be employed. As used herein, the term "polyester carrier film" refers to a film of polyester and release agent according to this invention prior to deposition of a layer of metal thereon. The term "transfer film" refers to a composite of the polyester carrier film with a metal layer of metal deposited on an outer surface of the polyester carrier film. The primary intended use of the novel polyester carrier film is to receive, carry and transfer some or all of the metal from the metal layer onto a surface of a substrate.

The novel polyester carrier film has two sides and has a base layer B of polyester. The polyester carrier film can be monolithic consisting only of layer B, or a composite of multiple layers of polyester. A preferred embodiment of the invention includes at least a two layer coextruded polyester carrier film, that includes at least one outer layer A adjacent one side of base layer B with an optional opposite outer layer C. Other embodiments may include one or more inner layers $I_1, I_2, I_3 \ldots I_n$, positioned between the outermost and B layers, such as an $A/I_1/I_2/B/C$ structure, for example. The outermost layers, whether A, B, or C, are sometimes referred to as skin layers. Any layer may contain reclaimed polyester resin.

In the present invention either or both outer surfaces of the skin layers have metal adhesion of less than 100 g/in, preferably less than 50 g/in, and more preferably less than 20 g/in, measured as described in Test Methods section below. The metal adhesion property is achieved by blending into the polyester of the film surfactants that are either ionic, nonionic or a combination thereof. For cost effectiveness it is preferable that the surfactant component is present only in the outermost layer or layers, which are normally thinner than the total thickness of inner layers, i.e., non-skin layers.

Some examples of nonionic surfactants may be cetostearyl alcohol, stearyl alcohol, oleyl alcohol, cetyl alcohol, pentaethylene glycol monododecyl ether, polyoxypropylene glycol alkyl ethers, octaethylene glycol monododecyl ether, lauryl glucoside, polyoxyethylene glycol octylphenol ethers, octyl glucoside, and decyl glucoside.

Some examples of anionic surfactant may be perfluorooctanesulfonate, perfluorobutanesulfonate, sodium dodecylbenzenesulfonate, sodium sulphate, alkyl benzene sulfonates, dioctyl sodium sulfosuccinate, alkyl ether phosphate, alkyl aryl ether phosphate, sodium stearate; perfluorononanoate, perfluorooctanoate, sodium lauroyl sarcosinate, sodium myreth sulfate, sodium lauryl sulfate, sodium laureth sulfate, and ammonium lauryl sulfate, and more generally alphatic and aromatic sulphonates.

There are a number of companies that produce master batches of surfactant compounds in PET for example, T7910 from Toray Industries, Inc. containing sodium dodecylbenzenesulfonate, Tas1125 from Sukano containing an aliphatic sulphonate, or Elecut® S618-A1 from Takemoto Oil and Fat containing a proprietary mixture of nonionic and anionic surfactants.

As presently understood, the parameter that mainly affects the desired degree of metal adhesion between the metal layer and an outermost polyester layer is the surface density, i.e., mass per unit area, of surfactant on the outermost surface of the polyester skin layer when the metal layer is applied. Surfactant that is initially uniformly dispersed within the polyester resin that forms the skin layer will bloom to the surface during the carrier film manufacturing process. The amount of surfactant incorporated in the polyester resin should take the blooming effect into account. That is, as thickness of the of the skin layer decreases, less surfactant-bearing polyester resin is used, and therefore, less surfactant at any given surfactant concentration in the polyester is available to migrate to the surface. Accordingly, the concentration of surfactant in the polyester resin to achieve a preselected level of metal adhesion should be increased as the thickness of the corresponding polyester layer decreases. The concentration of surfactant by weight in any outer layer should be at least about 0.01 wt %, preferably at least about 0.05 wt %, and more preferably at least about 0.10 wt %. The concentration of surfactant by weight in any outer layer is preferably less than 10 wt %, more preferably less than 5 wt %, and most preferably less than 3 wt %.

An advantageous feature of this invention is that metal adhesion can be controlled to a preselected value within a narrow range by adjusting the concentration of release agent in the polyester carrier film. Preferably the metal adhesion can be controlled to within a range of ±10 g/in of a target metal adhesion value. Pursuant to the guidelines just described, the actual amount of surfactant will be adjusted depending upon the thickness of the skin layer to provide a suitable metal adhesion value and should be determined by one of ordinary skill in the art without undue experimentation.

Juxtasposition of the elements discussed above can be understood with reference to FIG. 1. The figure shows a cross section of an embodiment of a metal transfer film 10 in proximity to a substrate 15 coated with a layer of adhesive 11. The novel metal transfer film has a multilayer composite polyester carrier film 1 of three substrata 2, 4 and 6, in the illustrated embodiment. Base layer 2 is a primary component layer of the multilayer carrier film 1. Adjacent and directly in contact with the base layer are layers 4 and 6. Being outermost layers of the composite polyester carrier film, layers 4 and 6 are designated as skin layers.

Figure 1:
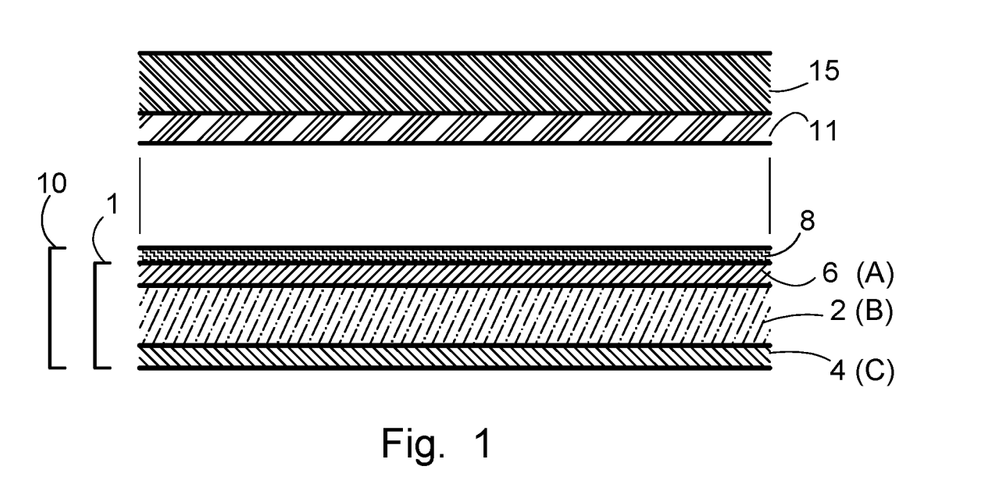
FIG. 1 is a schematic cross section view of an embodiment of the novel metal transfer film in proximity to an adhesive coated substrate prior to transferring a metal layer.
Figure 2:
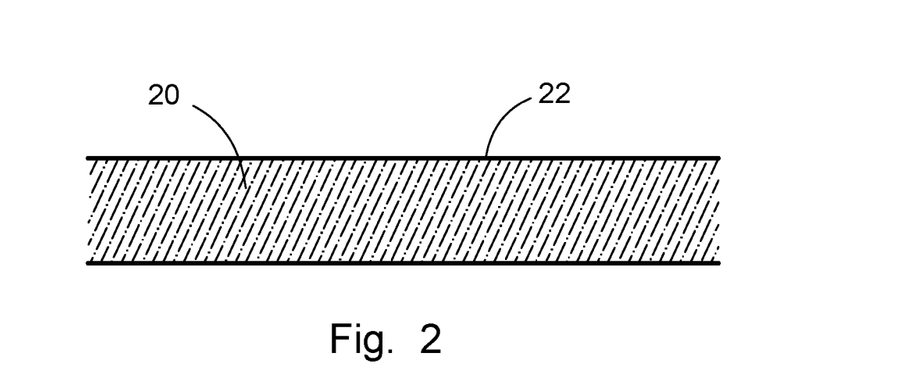
FIG. 2 is a schematic cross section view of an embodiment of the novel polyester carrier film 20 having an outer surface 22.

The figure shows that a metal layer 8 is deposited in direct contact with the side of skin layer 6 opposite the base layer 2. In traditional metal transfer films, there is an extra release layer positioned between the metal layer 8 and the outermost layer 6 the function of which has been described above. The novel metal transfer film does not have a separate and distinct release layer.

In use, an adhesive layer 11 coated onto a receiving substrate 15, is brought in contact with the metal layer 8 of the metal transfer film 10. The metal layer is then bonded to the substrate by the adhesive layer and thereafter the base layer 1 is stripped away from the metal layer. This process leaves the metal layer attached to the receiving substrate by the adhesive layer 11. An advantage of the novel metal transfer film is that all of the layers of the carrier film consist essentially of polyester. By "consists essentially of" is meant that the polymer content of the film is at least about 99 wt % and preferably exclusively polyester. The film can include, usually in small proportion to the polymer, and in addition to the operative surfactants, other non-polymeric ingredients such as stabilizers and additives that do not materially affect the novel aspects of the invention. Only the polymeric film remains after stripping the metal layer. Because the polymeric component of every layer of the carrier film is the same polymer, preferably PET, the residual carrier film can be recovered and recycled as a raw material for use in the same or a different end use application. Additional aspects, features and advantages of the invention will be explained, below.

In a primary aspect, the present invention calls for providing a metal transfer film consisting of a carrier film of predominantly polyester and a metal layer directly in contact with the carrier film. A release layer as used in traditional metal film transfer operations is not present between the carrier film and the metal layer. The normally very high metal adhesion of the polymeric carrier film is adjusted to a preselected lower adhesive strength by incorporating a suitable release agent into the carrier film polymer. In accord with the principles disclosed herein, it is possible to incorporate into a polyester layer an amount of release agent effective to provide a desired degree of metal adhesion called for by a converter in a metal transfer film process. The preferred release agent is a surfactant or combination of surfactants. Preference is given to use of a mixture of anionic and nonionic surfactants. Optionally, hydrocarbon wax, such as paraffin wax, can be added to any or all layers of the film. Generally, the greater amount of release agent incorporated into the metal-contacting layer of the carrier film at a given layer thickness, the lower the metal adhesion and the more easily the metal strips from the transfer film.

The polymeric carrier film can be monolayer or it can be a composite of multiple layers of polyester. In a multilayer structure the carrier film layers are fused adjacent to each other, preferably by a thermal fusion process such as coextrusion such that layers will not delaminate under metal transfer film processing conditions. A so-called A/B multilayer structure with a base layer (layer "B") and a skin layer (layer "A") is preferred. The skin layer is the layer in contact with the metal layer. An A/B/C structure is an alternately preferred structure for the novel polyester-based carrier film in which the "C" layer is a skin layer on the base layer surface opposite the A layer. Preferably the base layer is the predominant layer in thickness and bulk of the whole polyester-based carrier film. In a multilayer composite structure, the surfactant release agent particles should be present at least in the metal-contacting layer, but may also be present in other layers of the carrier film.

The controlled metal release property of the polyester carrier film is obtained by incorporating surfactant into the carrier film, and preferably in only one or more of the outer layers. Preferably the surfactant is an anionic surfactant, a nonionic surfactant or a combination thereof. Metal adhesion of PET without an incorporated surfactant release agent is typically much greater than 150 g/in. Incorporation of surfactant according to this invention can provide metal adhesion of less than 100 g/in, preferably about less than 50 g/in, and more preferably less than 20 g/in.

In some end use applications it is desirable to transfer effectively all of the deposited metal whereas in other cases it is desirable to transfer only specific portions of the metal. According to this invention, all or any selected parts of the metal deposited onto the surface of the base layer may be readily transferred to the substrate utilizing well known techniques.

Typical schemes for a metal transfer process call for providing carrier films from film "converters", i.e., suppliers and processors of film who provide, treat and/or modify the polyester film in secondary operations that are entirely separate from and subsequent to the manufacture of the polyester film. Such polyester carrier films include a non-polyester composition release layer coating applied to an outer surface of a monolithic polyester film. Those films are in turn metalized on the release layer via a process such as vapor deposition or sputtering. The metal transfer film of polymeric base layer/release layer/metal layer structure is used to apply metal to substrate products such as paperboard that are not directly metalizable by conventional means. The paperboard converters specify, and the film converters supply, desired degrees of metal adhesion based on the nature of the product and the metal. An advantage of this invention is the ability to control the bond strength of the metal to the PET base layer to a preselected value within the range of metal adhesion normally desired by paperboard converters. The metal transfer film of this invention does not have a special, non-polyester-based release layer between the base layer and the metal. Thus the polyester base film metalizing converter can apply the metal in direct contact with the polyester base layer of the carrier film. An intermediate release layer typically applied as a coating on the base film is not required. This feature provides many productivity enhancing and cost saving benefits. It is especially valuable that the concentration of surfactant and optional wax release agent incorporated into the polymeric base layer can modify the metal adhesion of the carrier film to match the different specifications for diverse metal transfer end use applications of metal transfer converters. This invention further can provide metal adhesion with precision of narrow tolerance limits of the metal transfer converters' target.

It may be desirable to provide the carrier film in metal transfer processes with a preselected degree of surface roughness. A smooth or rough surface may be desired to create a desired visual appearance of the finished metal-coated substrate product. This can be accomplished by giving the carrier film surface a texture that shapes the metal as well as the adhesive of the substrate as the adhesive is brought into contact with the metal layer. In such a way the texture of the carrier film is transferred to the substrate. It is also typically desired to impart roughness by adding particles to a least one of the outer surfaces of the film in order to control friction during film handling operations as is well known in the art. Many types of particles may be used such as silica, calcium carbonate, talc, alumina, or polymeric particles, such as, cross-linked polystyrene, acrylic, polyamide, or combinations thereof. As used herein, a smooth surface is defined as having surface roughness Ra of about 5-150 nm. A more smooth surface has Ra of about 5-100 nm, and a very smooth surface has Ra of about 5-50 nm. A rough surface typically suitable to produce a matte appearance of the transferred metal, has an Ra of about 200-500 nm.

The optional wax release agent can be included in one or more film layers to modify the release characteristics of the film provided by the surfactant primary release agent. The wax need not be added to the outer release layer in order to be effective since the wax will migrate from within the film through the outer layers to the surface of the film during stretching and heat setting processes of film making. The wax can be added as a separate additive to the polyester resin when forming a carrier film layer. A preferred method of adding wax release agent to a specific layer includes recovering a waste or discarded polyester film that originally had a paraffin wax coating. The wax-coated film is recycled by shredding the film to fine particle size, agglomerating the shredded film by use of a bladed centrifuge process, and then re-extruding the wax containing resin into pellets. The resulting recycled resin pellets can be blended with other raw material resin and additional wax, as appropriate to form one or more layers of the polyester carrier film. Typically, the wax is about 0.1-1 wt. % of recycled polyester film. Any wax-containing layer of the novel carrier film can contain up to 100 wt. % of recycled polyester film.

Without wishing to be bound by any particular theory, it is contemplated that the primary mechanism for modifying adhesion of the metal layer to polyester of the carrier film is the creation during metalization of a metal oxide layer between the polyester and the pure metal layers. The surfactant at the surface of the polyester carrier film supplies oxygen at this surface. Surfactants containing nitrate ion, sulfate ion, alkyl sulfate ion, sulfonate ion, or alkyl sulfonate ion are very suitable in this regard. Metal deposition methods for metalizing films typically include first evacuating oxygen from vapor, usually air, in the chamber in which metalization is to be carried out. This permits highly pure metal to deposit on and bond with the carrier film polymer. According to this invention, oxygen brought to the polymer surface by the surfactant rapidly (i.e., normally within a few minutes) reacts with the metal to create a layer of metal oxide between the polyester carrier film and the bulk of the deposited metal layer more distant from the surface. The resulting metal oxide layer is less adhesive to the polyester and thus facilitates release of the metal layer during the later metal transfer operation.

It is thus understood that this invention is particularly well suited to metal transfer operations involving any metals that readily oxidize. Metals commonly used are aluminum, copper, silver, titanium, and a mixture of these.

One preferred embodiment of the novel carrier film is a two layer PET film structure in which one layer is a skin layer with a thickness of preferably about 0.1-10 microns, more preferably about 0.2-6 microns, and most preferably about 0.3-2 microns. The second carrier film layer constitutes most of the structure thickness that is preferably about 5-75 microns, more preferably about 8-50 microns, and most preferably 10-25 microns. The second carrier film layer optionally contains wax added from ground, recycled, paraffin wax-coated film. The skin layer has a surface roughness, Ra, of preferably about 5-500 nm, more preferably about 5-200 nm, and most preferably about 5-50 nm.

Another preferred embodiment is a three layer PET film structure in which the non-skin carrier film layer is substantially free of added particles. One or both skin layers have release properties by incorporation of surfactants. The skin layers preferably have a thickness of about 0.1-5 microns, more preferably about 0.2-3.6 microns, and most preferably about 0.3-2 microns. The non-skin carrier film layer can contain wax release agent from addition of recycled paraffin wax coated film. The carrier film has a thickness of about 5-75 microns, more preferably about 8-50 microns, and most preferably about 10-25 microns.

The polyester for use in this invention can be prepared by any known method such as by the polycondensation of terephthalic acid or an ester-forming derivative thereof with an alkylene dihydroxyl compound. For example, these polymers can be copolymers of repeating units derived from aromatic dicarboxylic acid aliphatic glycol. Examples of suitable aromatic dicarboxylic acid are terephthalic acid, napthalenedicarboxyl acid, isophthalic acid and the like. Examples of aliphatic glycol are ethylene glycol, butanediol, neopentyl glycol, trimethylene glycol, cyclohexane dimethanol and the like. Examples of polyesters for use in the invention include copolymers comprising alkylene terephthalate or alkylene napthalenate as the main recurring units in the polymer chain. A preferred polyester is polyethylene terephthalate.

EXAMPLES

This invention is now illustrated by examples of certain representative embodiments thereof, wherein all parts, proportions and percentages are by weight unless otherwise indicated.

Test Methods

Thickness: Overall film thicknesses were measured by micrometer using a stack of 10 sheets and dividing the measurement by 10. Measurements were repeated every 9 inches in the transverse direction of the web. The thickness of each coextruded layer of the multilayer film was calculated by the ratio of the corresponding extrusion flow rate to the total extrusion flow rate of all layers.

Metal Adhesion: Metal adhesion was measured by a 180 degree ethylene acrylic acid polymer peel test consisting of heat sealing an adhesive layer of Dow Primacor® 3300 EAA polymer to the metalized side of the film using a Sentinel Model 12-ASL Sealer at 220° F. and 38 psi for 20 seconds. An Instron® 4200-004 tensile test machine was used to measure the peel force to peel away the metal with the adhesive layer at 180 degrees from the metalized surface of the film.

Surface Roughness: Surface roughness ("Ra") was measured by a Surfcorder Model SE-500 surface roughness measurement instrument. The measurements were repeated 3 times and the average value of Ra was recorded Surface Resistivity: Surface resistivity was measured with a concentric ring probe from TREK, Inc, Model No. 152 concentric ring probe resistivity meter according to ASTM Standard D 257-99. The testing conditions were 25° C. at 50% of relative humidity.

Surface Energy: Surface energy was determined by using the known numerical relationship between surface tension in dynes/cm of a polymer surface and the contact angle of a pure water drop deposited onto the surface (Zisman correlation). The contact angle was measured using a Contact Angle Meter (from Tantec, Schaumberg, Ill.) as described in U.S. Pat. No. 5,268,733.

Procedure: Three layer PET carrier films having A/B/C layer structure and two layer films having A/B layer structure for the examples were prepared by the following method. PET and ingredients listed in Table I, below, for each layer were blended, dried and then extruded in conventional melt extrusion equipment. To produce base layer B a serial set of single screw extruders was used. Reclaimed PET film was optionally included in this layer. For the composition of layers A and C, PET plus the other ingredients were mixed and fed through a counter-rotating twin screw extruder and dried via in-line vacuum in the melt zones of the extruder. Extrusion temperatures were in the range of 270° C. to 300° C. The melt flows from each extruder was filtered separately and then fed into a melt distributor such that the melt flow from the twin screw extruder was split to form layers A and C that were overlaid onto opposite sides of the melt flow forming layer B to form an overall A/B/C structure. To produce a two layer A/B structure, the twins screw extruder melt flow was overlaid only on one side of the base layer melt flow. The resulting combined melt flow entered a flat die set at about 270° C. The melt curtain exiting the die dropped and was electrostatically pinned onto a rotating casting roll chilled to about 20° C. causing the curtain to solidify into a continuously moving amorphous sheet. This sheet entered a set of rotating heated rolls of different speeds such that the traveling sheet was oriented by stretching about 4 times in the machine direction. Next, this machine-direction oriented sheet traveled into a multi-zone enclosed heated oven, where the film was first preheated to a temperature of about 90° C. In the next zone, at about 165° C., the moving film was oriented by stretching about 4 times in the transverse direction, and then heat set at about 240° C. Then the film was relaxed by about 3% in the relaxation zone of the oven. The resulting two layer A/B and three-layer A/B/C films were wound up into rolls as is standard industry practice. Generally, stretching of the film in a machine direction about 3 times-6 times and in the transverse direction about 3 times-6 times can be utilized to thereby cause the release agent to bloom to the outer surface of the polyester carrier film.

Comparative Example 1

A two layer PET carrier film was prepared by coextruding adjacent skin layer A and base layer B. Inert filler particles were dispersed in each of the molten polymer feeds to the film forming unit. Thickness and composition of the layers is shown in Table I. The concentrations and sizes of the particles gave the outer surfaces of the layers different surface roughnesses. No metal release agent according to this invention were included in the layers. The outer layers had surface resistivity on the order of magnitude of $10^{16}$ ohms/sq. Analytical results for this and other examples are presented in Table II. The surfaces of layers A and B also had surface energies typical for PET film as indicated by surface tensions of 40 dynes/cm.

The surface of skin layer A was metalized with a layer of aluminum of thickness equal to a measured optical density of 2.5 by metal vapor deposition. Metal adhesion was of the aluminum layer on layer A was measured as 135 g/in. This is a high adhesion strength and would not be suitable for a metal transfer film.

Example 2

A two layer PET carrier film was prepared as in Comp. Ex. 1 with the exception that a release agent surfactant particles of sodium dodecylbenzenesulfonate at concentration 0.48% was uniformly dispersed into skin layer A. Surface resistivity of layer A was much reduced (order of magnitude of $10^{11}$ ohms/sq.) and the surface tension increased to surface tension of greater than 53.5 dynes/cm. The carrier film was coated with aluminum to an optical density of 2.5. Metal adhesion was measured to be 45.7 g/in. This represents a significant reduction relative to Comp. Ex. 1 The surface resistivity of layer B lowered slightly (relative to Comp. Ex. 1) but was still at the $10^{14}$ level.

Example 3

The procedure of Ex. 2 was repeated except that a blend of release agent surfactants alkane sulphonate (0.06%) and sodium sulfate (0.003%) was incorporated in skin layer A. Layer A had a surface resistivity on the order of $10^{16}$. Following aluminum metalization, metal adhesion was measured to be 26.7 g/in. The transfer film would be suitable for a metal transfer film.

Example 4

The procedure of Ex. 2 was repeated except that aliphatic sulphonate was substituted as the surfactant release agent at 0.015% in skin layer A. The surface resistivity reduced to a relatively low value of the order of magnitude of $10^{12}$ ohms/sq. After coating the skin layer with a 2.5 optical density thickness metal layer of aluminum, the metal adhesion was measured to be a very acceptable value of 11.2 g/in.

Example 5

The procedure of Ex. 4 was repeated except that the concentration of the surfactant release agent was doubled to 0.03%. Resistivity of layer A dropped to the $10^{10}$ range. After depositing aluminum to an optical density of 2.5, the metal adhesion was found to also drop to 11.2 g/in. that is very good for many metal transfer operations.

Examples 6 and 8

In these examples the procedure of Ex. 2 was repeated with a mixture of anionic/nonionic surfactants serving as the release agent. In Ex. 6 the concentration of the surfactant was 1.2% and in Ex. 8 the concentration was raised to 2.0%. Again, resistivities of the B layer remained at the $10^{14}$ level. The surfactant containing layer A showed nearly equal and significant resistivity reduction relative to Ex. 1. After coating with aluminum, metal adhesion of the 1.2% surfactant sample was well in the range of suitable metal transfer film at 7.9 g/in. Increasing the concentration to 2.0% surfactant lowered the metal adhesion farther to 6 g/in.

Example 7

The procedure of Ex. 2 was repeated except that the polymer of layer A was a blend of 50% virgin PET and 50% Auriga PET resin "8428". The Auriga PET resin contains surfactant. The surface resistivity of layer A did not change from that of Comp. Ex. 1 however, metal adhesion of the carrier film to the aluminum layer did reduce to 33.3 g/in, which is well into the acceptable range for metal transfer films.

Example 9

The procedure of Ex. 2 was repeated with the exception that 0.48% sodium dodecylbenzenesulfonate was added to thicker layer B as well as layer A. Due to the presence of surfactant in both layers, resistivities of both surfaces dropped to the approximate $10^{11}$ level. After metalization to 2.5 optical density with aluminum, the metal adhesion of layer A was determined to be 6.3 g/in. This result suggests an interaction between the layers in that the effect of the same surfactant at the same level in layer A was much enhanced by the surfactant in the adjacent layer B.

Example 10

The procedure of Ex. 6 was repeated except that 1.2% mixed anionic/nonionic surfactant was incorporated into thicker layer B as well as in layer A. Comparing this example to Ex. 6, it appears that the analytical results were somewhat analagous to those of Ex. 9. The surface resistivities of both A and B layers dropped by four orders of magnitude relative to Comp. Ex. 1. Additionally, the metal adhesion of layer A of 4.8 g/in. was significantly lower than in Comp. Ex. 1 and slightly lower than 6 g/in. of Ex. 6. Thus there is agreement with the suggestion that some interaction between the layers due to presence of the same release agent surfactant in both on the metal adhesion value of layer A.

Example 11

The procedure of Ex. 8 was repeated with the exception that the additives composition of layer B was changed. Firstly the 0.3 μm polystyrene particles incorporated into layer B at 0.06% was replaced by 0.3% of 2.4 μm silica particles. Additionally, layer B included 0.05% paraffin wax release agent. Analytical results showed that surface resistivity of layer A dropped similarly as in Ex. 8 to the $10^{10}$ level and that the metal adhesion reduced to a very low value of 2 g/in. The lower metal adhesion value further supports the suggestion that wax from layer B affects adhesion on the surface of layer A. Example 11 also has a relatively high surface energy of greater than 53.5 dynes/cm.

Example 12

A three layer PET film carrier film is prepared by coextruding an A/B/C composition and structure. Both skin layers A and C have the same calcium carbonate/aluminum oxide particle package for modifying the surface texture and a release agent of mixed anionic/nonionic surfactant at 2.0% concentration. The base layer B includes a silica particle component and 0.013% paraffin wax release agent. The surface of layer A was metalized with aluminum to a thickness equivalent to 2.5 optical density. The metal adhesion of the carrier film to the metal layer was 5.1 g/in.

TABLE I

| | A/B/C Layer Thickness (μm) | A Layer Composition | B Layer Composition | C Layer Composition |
|---|---|---|---|---|
| Comp. Ex. 1 | 5/28/0 | PET<br>1.5% 0.9 μm $CaCO_3$ | PET<br>0.06% 0.3 μm polystyrene | none |
| Ex. 2 | 5/28/0 | PET<br>1.5% 0.9 μm $CaCO_3$<br>0.48% Sodium dodecyl-benzenesulfonate | PET<br>0.06% 0.3 μm polystyrene | none |
| Ex. 3 | 5/28/0 | PET<br>1.5% 0.9 μm $CaCO_3$<br>0.06% Alkane sulphonate<br>0.003% Sodium sulphate | PET<br>0.06% 0.3 μm polystyrene | none |
| Ex. 4 | 5/28/0 | PET<br>1.5% 0.9 μm $CaCO_3$<br>0.015% Aliphatic Sulphonate | PET<br>0.06% 0.3 μm polystyrene | none |
| Ex. 5 | 5/28/0 | PET<br>1.5% 0.9 μm $CaCO_3$<br>0.03% Aliphatic Sulphonate | PET<br>0.06% 0.3 μm polystyrene | none |
| Ex. 6 | 5/28/0 | PET<br>1.5% 0.9 μm $CaCO_3$<br>1.2% mixture of sodium dodecyl-benezesulfonate and a nonionic surfactant | PET<br>0.06% 0.3 μm polystyrene | none |
| Ex. 7 | 5/28/0 | PET (50% virgin PET<br>(50% Auriga 8428<br>1.5% 0.9 μm $CaCO_3$ | PET<br>0.06% 0.3 μm polystyrene | none |
| Ex. 8 | 5/28/0 | PET<br>1.5% 0.9 μm $CaCO_3$<br>2.0% mixture of sodium dodecyl-benezesulfonate and a nonionic surfactant | PET<br>0.06% 0.3 μm polystyrene | none |
| Ex. 9 | 5/28/0 | PET<br>1.5% 0.9 μm $CaCO_3$<br>0.48% Sodium dodecyl-benzenesulfonate | PET<br>0.06% 0.3 μm polystyrene<br>0.48% Sodium dodecyl-benzenesulfonate | none |
| Ex. 10 | 5/28/0 | PET<br>1.5% 0.9 μm $CaCO_3$<br>1.2% mixture of sodium dodecyl-benzenesulfonate and a nonionic surfactant | PET<br>0.06% 0.3 μm polystyrene<br>1.2% mixture of sodium dodecyl-benzenesulfonate and a non-ionic surfactant | none |
| Ex. 11 | 5/28/0 | PET<br>1.5% 0.9 μm $CaCO_3$<br>2.0% mixture of sodium dodecyl-benzenesulfonate and a nonionic surfactant | PET<br>0.3% 2.4 μm silica<br>0.05% paraffin wax | none |
| Ex. 12 | 1.2/22/1.2 | PET<br>0.13% 1.0 μm $CaCO_3$<br>0.3% 0.1 μm $Al_2O_3$,<br>2.0% mixture of sodium dodecyl-benzenesulfonate and a nonionic surfactant | PET<br>0.075% of 2.4 μm silica<br>0.013% paraffin wax | Same as Layer A |

TABLE II

| | A Layer Surface Resistivity at 25 degC, 50% RH (ohms/sq) | B Layer Surface Resistivity at 25 degC, 50% RH (ohms/sq) | A Layer Surface Tension by contact angle (dynes/cm) | B Layer Surface Tension by contact angle (dynes/cm) | A Layer Metal Thickness (optical density) | A Layer Metal Adhesion (g/in) |
|---|---|---|---|---|---|---|
| Comp. Ex. 1 | $1.8 \times 10^{16}$ | $3.1 \times 10^{16}$ | 40 | 40 | 2.5 | 135 |
| Ex. 2 | $1.1 \times 10^{11}$ | $1.6 \times 10^{14}$ | >53.5 | 40 | 2.5 | 45.7 |
| Ex. 3 | $2.2 \times 10^{16}$ | | | | 2.5 | 26.7 |
| Ex. 4 | $1.1 \times 10^{12}$ | | | | 2.5 | 11.2 |
| Ex. 5 | $4.3 \times 10^{10}$ | | | | 2.5 | 7.9 |
| Ex. 6 | $1.4 \times 10^{10}$ | $6.5 \times 10^{14}$ | >53.5 | 41 | 2.5 | 6 |
| Ex. 7 | $1.9 \times 10^{16}$ | | | | 2.5 | 33.3 |
| Ex. 8 | $1.2 \times 10^{10}$ | $5.7 \times 10^{14}$ | >53.5 | 41 | 2.5 | 5.2 |
| Ex. 9 | $8.0 \times 10^{10}$ | $1.6 \times 10^{11}$ | >53.5 | >53.5 | 2.5 | 6.3 |
| Ex. 10 | $1.6 \times 10^{10}$ | $1.1 \times 10^{10}$ | >53.5 | >53.5 | 2.5 | 4.8 |
| Ex. 11 | $1.2 \times 10^{10}$ | | >53.5 | | 2.5 | 2 |
| Ex. 12 | | | | | 2.5 | 5.1 |

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. The entire disclosures of U.S. patents and patent applications identified in this application are hereby incorporated by reference herein.

What is claimed is:

1. A polyester carrier film for use in metal transfer applications having an outer surface, a thickness of about 4-75 µm and at least one layer consisting essentially of a polyester and a release agent selected from the group consisting of anionic surfactant, non-ionic surfactant, about 0.1-1 wt % paraffin wax dispersed in the polyester, and a combination thereof, in which the release agent is present in a blend with the polyester in amount effective to provide the outer surface with a preselected adhesion value to a metal in the range of about 1-100 g/in measured by a 180 degree ethylene acrylic acid polymer peel test, and
   in which concentration of anionic surfactant and non-ionic surfactant in the at least one layer is 0.01-3 wt %.

2. The polyester carrier film of claim 1 in which the release agent concentration in the outer surface is effective to control the metal adhesion to within a range of +10 g/in of the preselected adhesion value.

3. The polyester carrier film of claim 1 in which the polyester carrier film consists essentially of polyester and release agent selected from the group consisting of anionic surfactant, non-ionic surfactant, about 0.1-1 wt % paraffin wax dispersed in the polyester, and a combination thereof.

4. The polyester carrier film of claim 1 which comprises a base layer and a first skin layer of polyester on one side of the base layer and in which the first skin layer defines the outer surface.

5. The polyester carrier film of claim 4 which further comprises at least one inner layer of polyester between the base layer and the first skin layer.

6. The polyester carrier film of claim 4 in which the release agent is present only in the first skin layer.

7. The polyester carrier film of claim 4 which further comprises a second skin layer of polyester on a side of the base layer opposite the first skin layer.

8. The polyester carrier film of claim 7 which further comprises at least one inner layer of polyester between the base layer and one or both of the first skin layer and the second skin layer.

9. The polyester carrier film of claim 1 which further includes a transferable layer of metal adhered in direct contact with the outer surface to form a metal transfer film in which the metal is selected from the group consisting of aluminum, copper, silver, titanium and a blend thereof, and the transferable layer has a thickness corresponding to an optical density of 0.01-4.

10. A method of transferring metal to a substrate comprising the steps of:
   (A) providing a metal transfer film consisting of (i) a polyester carrier film having a thickness of about 4-75 µm, and an outer surface, the polyester carrier film having at least one layer consisting essentially of a polyester and a release agent selected from the group consisting of anionic surfactant, non-ionic surfactant, about 0.1-1 wt % paraffin wax dispersed in the polyester, and a combination thereof, in which the release agent is present in a blend with the polyester in amount effective to provide the outer surface with a preselected adhesion value to a metal in the range of about 1-100 g/in measured by a 180 degree ethylene acrylic acid polymer peel test, and (ii) a transferable layer of the metal deposited in direct contact with the outer surface, the transferable layer having a metal thickness equivalent to an optical density in the range of about 0.2-4.0,
   (B) providing a substrate article having a surface coated with an adhesive layer,
   (C) contacting the transferable layer of the metal transfer film with the adhesive layer of the substrate article such that the metal transfer film bonds to the adhesive layer of the substrate article, and
   (D) stripping the polyester carrier film from the metal layer, thereby transferring the metal layer to the substrate article.

11. The method of claim 10 in which the polyester carrier film consists essentially of polyester and release agent selected from the group consisting of anionic surfactant, non-ionic surfactant, about 0.1-1 wt % paraffin wax dispersed in the polyester, and a combination thereof.

12. The method of claim 10 in which the step of providing the metal transfer film further comprises obtaining a mixture comprising a thermoplastic polyester resin and release agent, heating the mixture effectively to melt the thermoplastic polyester resin, uniformly dispersing the release agent in the thermoplastic polyester resin, thereby forming a melt dispersion, forming a self-supporting film from a polymeric composition comprising the melt dispersion, and stretching the film in a machine direction about 3 times-6 times and in the transverse direction about 3 times-6 times, thereby causing the release agent to bloom to the outer surface of the polyester carrier film.

13. The method of claim 10 in which the polyester carrier film further comprises a base layer and a first skin layer of polyester on one side of the base layer, the first skin layer defining the outer surface.

14. The method of claim 13 in which the polyester carrier film further comprises a second skin layer on a side opposite the first skin layer, the second skin layer being free of release agent.

15. The method of claim 13 in which the base layer is free of release agent.

16. The method of claim 10 in which the metal layer consists essentially of a metal selected from the group consisting of aluminum, copper, silver, titanium, and a mixture thereof.

17. A polyester carrier film for use in metal transfer applications having an outer surface, a thickness of about 4-75 μm and at least one layer consisting essentially of a polyester and a release agent selected from the group consisting of anionic surfactant, non-ionic surfactant, and a combination thereof, in which the release agent is present in the at least one layer in concentration of 0.01-3 wt % in a blend with the polyester in amount effective to provide the outer surface with a preselected adhesion value to a metal in the range of about 1-100 g/in measured by a 180 degree ethylene acrylic acid polymer peel test.

18. The polyester carrier film of claim 17 in which concentration of release agent in the polyester carrier film is 0.0023-1.2 wt %.

* * * * *